United States Patent
Derr et al.

(10) Patent No.: US 8,347,015 B2
(45) Date of Patent: *Jan. 1, 2013

(54) POWER-OPTIMIZED FRAME SYNCHRONIZATION FOR MULTIPLE USB CONTROLLERS WITH NON-UNIFORM FRAME RATES

(75) Inventors: Michael N. Derr, El Dorado Hills, CA (US); Darren L. Abramson, Folsom, CA (US); Bryan C. Doucette, Folsom, CA (US); Karthi R. Vadivelu, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/305,591

(22) Filed: Nov. 28, 2011

(65) Prior Publication Data

US 2012/0072636 A1    Mar. 22, 2012

Related U.S. Application Data

(63) Continuation of application No. 11/395,678, filed on Mar. 30, 2006, now Pat. No. 8,069,294.

(51) Int. Cl.
*G06F 13/14*    (2006.01)
*G06F 3/00*    (2006.01)

(52) U.S. Cl. .......................... 710/305; 710/5

(58) Field of Classification Search .................. 710/305, 710/5
See application file for complete search history.

(56) References Cited

U.S. PATENT DOCUMENTS

| | | | |
|---|---|---|---|
| 5,253,254 A | 10/1993 | Roberts et al. | |
| 5,398,325 A | 3/1995 | Chang et al. | |
| 5,548,787 A | 8/1996 | Okamura | |
| 5,721,828 A | 2/1998 | Frisch | |
| 5,778,218 A | 7/1998 | Gulick | |
| 5,958,027 A | 9/1999 | Gulick | |
| 5,991,844 A | 11/1999 | Khosrowpour | |
| 5,999,199 A | 12/1999 | Larson | |
| 6,021,129 A | 2/2000 | Martin et al. | |
| 6,092,210 A | 7/2000 | Larky et al. | |
| 6,131,135 A | 10/2000 | Abramson et al. | |
| 6,202,164 B1 | 3/2001 | Gulick | |
| 6,564,304 B1 | 5/2003 | Van Hook et al. | |
| 6,600,739 B1 | 7/2003 | Evans et al. | |
| 6,715,007 B1 | 3/2004 | Williams et al. | |
| 6,754,267 B1 | 6/2004 | Shimanaka | |
| 6,772,266 B2 | 8/2004 | Nalawadi | |
| 6,801,971 B1 | 10/2004 | Devine et al. | |
| 6,810,484 B2 | 10/2004 | Govindaraman | |
| 6,868,461 B1 | 3/2005 | Mirkhani et al. | |

(Continued)

OTHER PUBLICATIONS

First Office Action for Chinese Patent Application No. 200780012370.5, Mailed Sep. 18, 2009, 14 pages.

(Continued)

*Primary Examiner* — Paul R Myers
*Assistant Examiner* — Christopher A Daley
(74) *Attorney, Agent, or Firm* — Blakely, Sokoloff, Taylor & Zafman LLP (57) ABSTRACT

A method, apparatus, and system to synchronize multiple host controllers with non-uniform frame rates. The apparatus includes a first host controller, a second host controller, and logic. The first host controller is configured to access memory at a first frame rate. The second host controller is configured to access the memory at a second frame rate which is different from the first frame rate. The logic is coupled to the first and second host controllers to synchronize the memory accesses of the first and second host controllers at a common frame rate. Other embodiments are described.

29 Claims, 7 Drawing Sheets

U.S. PATENT DOCUMENTS

| | | | |
|---|---|---|---|
| 6,978,412 | B1 | 12/2005 | Reents et al. |
| 7,042,911 | B2 | 5/2006 | Toshitani |
| 7,062,568 | B1 | 6/2006 | Senevirathne et al. |
| 7,539,793 | B2 | 5/2009 | Foster et al. |
| 7,689,745 | B2 | 3/2010 | Bennett |
| 2002/0034273 | A1 | 3/2002 | Spence et al. |
| 2002/0091916 | A1 | 7/2002 | Dowling |
| 2003/0225739 | A1 | 12/2003 | Chesson et al. |
| 2004/0088445 | A1 | 5/2004 | Weigold et al. |
| 2004/0199708 | A1 | 10/2004 | Tsukimori et al. |
| 2004/0255339 | A1 | 12/2004 | Agnoli et al. |
| 2006/0064522 | A1 | 3/2006 | Weigold et al. |
| 2006/0123180 | A1 | 6/2006 | Derr et al. |
| 2006/0218429 | A1 | 9/2006 | Sherwin et al. |
| 2006/0294274 | A1 | 12/2006 | Bennett |
| 2007/0011375 | A1 | 1/2007 | Kumar |
| 2009/0048646 | A1 | 2/2009 | Katoozi et al. |

OTHER PUBLICATIONS

Office Action for U.S. Appl. No. 11/159,980 mailed Mar. 27, 2008.
International Search Report and Written Opinion of the International Search Authority for International Application No. PCT/US2007/064478 mailed Aug. 29, 2007.
International Preliminary Report on Patentabiliy for International Search Authority for International Application No. PCT/US2007/064478 mailed Oct. 9, 2008.
Office Action for German Patent Application No. 11 2007 000 632.3-53 mailed May 4, 2009.
Notice of Allowance for U.S. Appl. No. 11/159,980 mailed Nov. 12, 2009.
Final Office Action for U.S. Appl. No. 11/159,980 mailed Aug. 18, 2009.
Final Office Action for U.S. Appl. No. 11/159,980 mailed Jun. 23, 2009.
"Advanced Configuration and Power Interface Specification", Hewlett-Packard Corporation, Intel Corporation, Microsoft Corporation, Phoenix Technologies Ltd., Toshiba Corporation, Revision 3.0a, (Dec. 30, 2005), 624 pages.
"Universal Serial Bus Specification", Compaq, Hewlett-Packard, Intel, Lucent, Microsoft, NEC, Philips, Revision 2.0, (Apr. 27, 2000), 650 pages.
"Universal Serial Bus Specification", Compaq, Intel, Microsoft, NEC, Revision 1.1, (Sep. 23, 1998), 327 pages.

POWER-OPTIMIZED FRAME SYNCHRONIZATION FOR MULTIPLE USB CONTROLLERS WITH NON-UNIFORM FRAME RATES

PRIORITY CLAIM

This continuation application is related to, and claims priority to, U.S. patent application Ser. No. 11/395,678, entitled "POWER-OPTIMIZED FRAME SYNCHRONIZATION FOR MULTIPLE USB CONTROLLERS WITH NON-UNIFORM FRAME RATES" filed on Mar. 30, 2006, now issued as U.S. Pat. No. 8,069,294, which is hereby incorporated by reference herein as though set forth in full.

TECHNICAL FIELD

This invention relates to the field of platform power management and, in particular, to synchronizing host controllers with non-uniform frame rates.

BACKGROUND

Due to ever increasing gate count and clock speeds in current computing platform designs, there is increasing value in platform power conservation. Low-power computing platforms are increasing in popularity because power consumption is highly related to battery life and heat dissipation, which affect mobility. In general, computing platforms that consume less power are more mobile. One way to conserve power is to alter functional behaviors which would allow certain components to stay in a lower power state for extended periods of time.

Presently, chipset implementations may utilize multiple controllers such as universal serial bus (USB) host controllers to increase performance. Multiple USB host controllers within a computing platform can increase performance by increasing the total bandwidth available to all USB devices in the platform. Generally, a legacy USB host controller such as a controller that complies with the USB Specification, Revision 1.1, can service two USB ports. Universal Serial Bus Specification, Revision 1.1, published Sep. 23, 1998. More recently, USB host controllers that comply with the USB Specification, Revision 2.0, may service more than two USB ports (e.g., six ports). Universal Serial Bus Specification, Revision 2.0, published Apr. 27, 2002. Although many ports may be serviced by a single USB host controller, many mobile computing platforms have multiple USB host controllers. Additionally, a single computing platform may include different types of USB host controllers.

Conventionally, the operation of each USB host controller is independent from the other USB host controllers (i.e., the state of one controller has nothing to do with the state of another controller). Furthermore, the operation of USB host controllers is periodic. For example, legacy USB host controllers fetch a new work list, or frame, every one millisecond (ms). USB host controllers operating in compliance with the USB 2.0 standard fetch new frames every 125 microseconds (μs).

During operation of the USB host controllers, the computing platform is typically in a normal operating power state. Common definitions of power states are available in the Advanced Configuration and Power Interface (ACPI) open standard. Advanced Configuration and Power Interface Specification, Revision 3.0a, published Dec. 30, 2005. For example, processors may operate in various "C" power states ranging from C0 (full power) to C4 (low power). The fetch, or frame, operations described above are typically performed when the processor and chipset are in the C2 power state. However, the processor and chipset may enter low-power state such as the C3 power state in between memory accesses.

If multiple USB host controllers are implemented, there may be several memory accesses distributed over time that prevent the processor from entering a low power state for an appreciable amount of time. For example, immediately prior to a memory access by a USB host controller, the USB host controller may issue a "start of frame" (SOF) marker. The periodic "start of frame" markers for a given USB host controller are conventionally triggered by host software independently of the "start of frame" markers for other USB host controllers. The random relationship of these markers may prevent the processor from entering a low-power state, resulting in substantially continuous power consumption.

The inefficiency resulting from these uncontrolled memory accesses by several USB host controllers is aggravated by the frame rate variation between legacy USB host controllers, which have a frame rate of approximately one millisecond, and USB host controllers that have shorter frame rates such as 125 microseconds. This difference in frame rates may further limit or even eliminate the opportunity for a processor to enter a low-power state.

Conventional technology does not adequately address this problem. Although some potential solutions propose pre-fetching the next several work lists, or frames, pre-fetching may introduce stale data because the USB host controller software is allowed to run very close to the hardware. Additionally, pre-fetching and other conventional technologies to save power using USB host controller behavior do not address the interaction between multiple host controllers with non-uniform frame rates.

BRIEF DESCRIPTION OF THE DRAWINGS

The present invention is illustrated by way of example, and not by way of limitation, in the figures of the accompanying drawings.

DETAILED DESCRIPTION

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the spirit and scope of the present invention.

One embodiment facilitates lower platform power consumption by altering the timing of memory accesses, such as direct memory access (DMA) frames, of universal serial bus (USB) host controllers. For example, logic may group memory accesses from multiple USB host controllers in such a way that the computing platform may remain in low-power states such as C3 power state for longer periods of time than if the memory accesses were not synchronized. Some embodiments may utilize hardware, while other embodiments may utilize a combination of hardware and firmware, to synchronize the multiple USB host controllers. Although the following description frequently refers to USB host controllers, other types of controllers and implementations may benefit from the same or similar embodiments.

Figure 1:
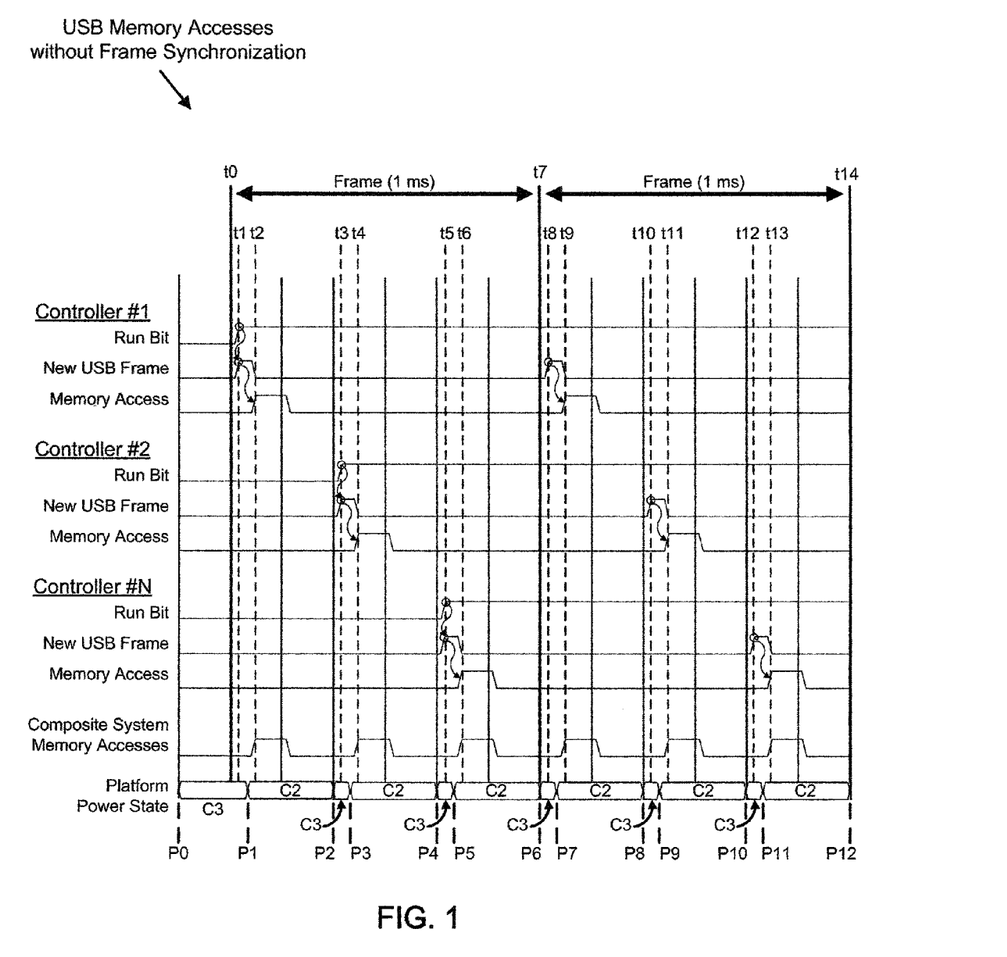
FIG. 1 illustrates one embodiment of a timing diagram for conventional operation of unsynchronized host controllers.

FIG. 1 illustrates one embodiment of a timing diagram for conventional operation of unsynchronized host controllers. In conventional computing platforms, the frame counters for multiple USB host controllers are not actively synchronized. Thus, in inactive USB schedules, controller fetches to system memory for the frame list and subsequent fetches occur independently per controller, possibly preventing other platform components from entering lower power states.

The illustrated timing diagram of FIG. 1 depicts the memory access signals of three unsynchronized USB host controllers. Without synchronization of the USB host controllers, they act independently of each other. Each USB host controller is individually initiated by host software. Once initiated, each USB host controller performs a new work list fetch, or start of frame, every one millisecond (ms) for legacy USB host controllers or every 125 microseconds (μs) for USB host controllers which comply with the USB 2.0 standard. In a worst-case scenario, the USB host controllers may perform their fetches in evenly dispersed intervals over a given time interval. For convenience, the frame of USB host controller #1 is used as the reference time interval. As one example, the distribution of the frames for the three USB host controllers results in a new frame and memory access being performed by a USB host controller three times every one millisecond. Thus, within a two millisecond time interval, the three USB host controllers may initiate new frames at times t1, t3, t5, t8, t10, and t12. Similarly, the USB host controllers may perform individual memory accesses at times t2, t4, t6, t9, t11, and t13.

Even though an individual USB host controller may not require the processor to be in a high-power state for a substantial portion of each frame, the composite system memory accesses of all of the USB controllers may limit the amount of time that the processor may enter a low-power state. For example, the processor may spend most of any given frame in the C2 power state, as illustrated at the bottom of the timing diagram.

This even dispersal of fetches, or memory accesses, over the 1 ms time interval prevents the processor from entering into a low power state, thus preventing power conservation. Additionally, USB host controllers which perform memory accesses more frequently than every one millisecond, may further limit power conservation. For example, a USB host controller which initiates a new frame and performs a memory access every 125 microseconds limits the available time for power conservation compared to a USB host controller which initiates a new frame every one millisecond because the processor enters the C2 power state about eight times every millisecond. Moreover, the combination of USB host controllers operating at different frame rates impedes power conservation even more.

Figure 2:
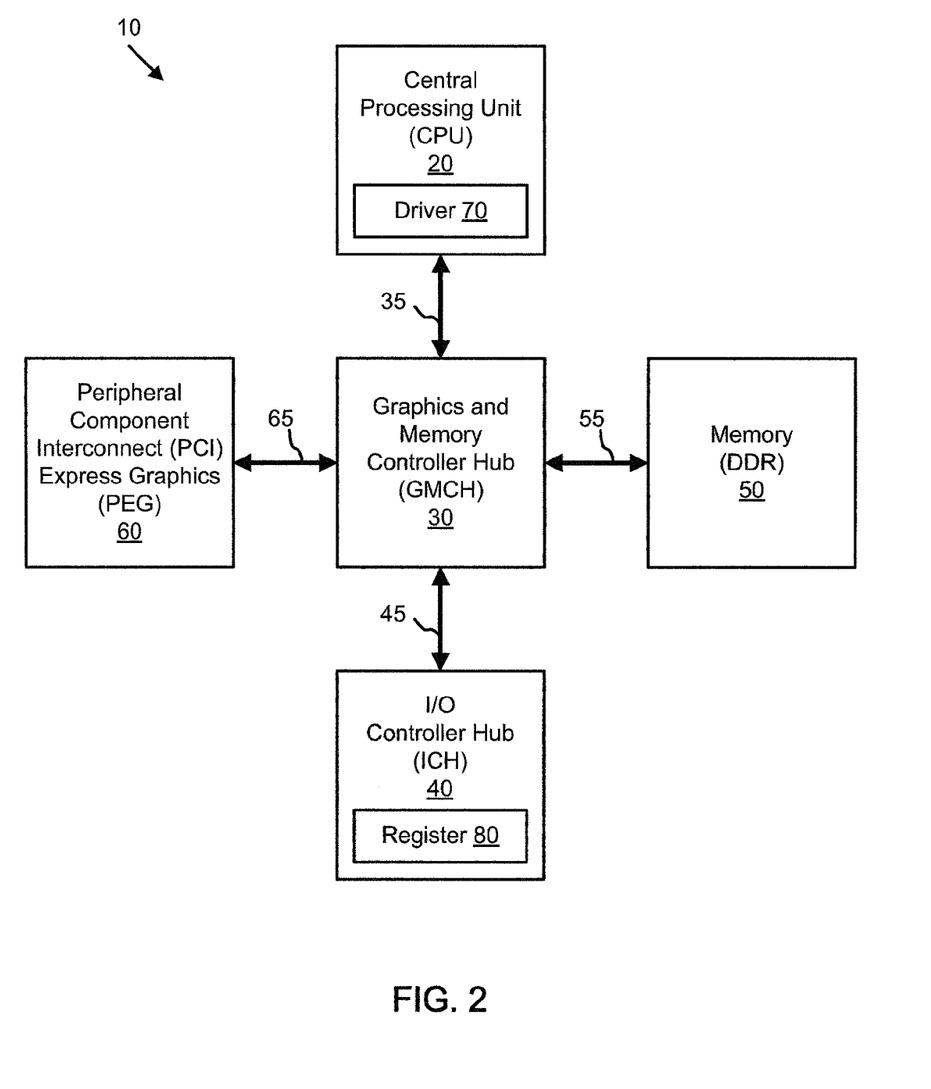
FIG. 2 illustrates one embodiment of a computing platform.

FIG. 2 illustrates one embodiment of a computing platform 10. The depicted computing platform 10 includes a central processing unit (CPU) 20 coupled to a graphics and memory controller hub (GMCH) 30 via a processor bus 35. For convenience, the central processing unit 20 is also referred to as the processor 20. In one embodiment, the processor 20 is a processor in the Pentium® family of processors, including the Pentium® IV processors available from Intel Corporation of Santa Clara, Calif. Alternatively, the processor 20 may be another type of processor. In another embodiment, processor 20 may include multiple processor cores. Additionally, the graphics and memory controller hub 30 may be in the same chip as the processor 20, in some embodiments. Furthermore, the graphics and memory controller hub 30 may work for all cores or processors in a chip. Alternatively, the graphics and memory controller hub 30 may include different portions that may work separately for different cores or processors in a chip.

The depicted computing platform 10 also includes an input/output (I/O) controller hub (ICH) 40 coupled to the graphics and memory controller hub 30 via a backbone bus 45. The I/O controller hub 50 provides an interface to I/O devices within or connected to the computing platform 10. In one embodiment, the graphics and memory controller hub 30 and the I/O controller hub 40 are combined in a single chipset. Alternatively, the graphics and memory controller hub 30 and the I/O controller hub 40 may be integrated on a single chip or may be implemented independently of a chipset. In another embodiment, the processor 20 may connect directly to the I/O controller hub 40 in another manner. One example of the I/O controller hub 40 is shown and described in more detail with reference to FIG. 3.

The depicted computing platform 10 also includes a memory 50 coupled to the graphics and memory controller hub 30 via a memory bus 55 and a PCI express graphics chip 60 coupled to the graphics and memory controller hub 30 via a graphics bus 65. In one embodiment, the memory 50 may be double data rate (DDR) synchronous dynamic random access memory (SDRAM). Alternatively, the memory 50 may be another type of electronic data memory. Additionally, the memory 50 may be included in a chipset with the graphics and memory controller hub 30 and I/O controller hub 40 or may be separate. In one embodiment, the memory 50 may be referred to as main memory of the computing platform 10. The main memory 50 stores data and sequences of instructions and code represented by data signals that may be executed by the processor 20 or any other device included in the computing platform 10.

Referring again to the processor 20, a driver 70 may be stored on the processor to facilitate operations of one or more USB host controllers. Additionally, the driver 70 may facilitate operations of an I/O device coupled to a USB host controller. In another embodiment, the driver 70 may be at least partially stored on the memory 50.

One or more registers 80 may be maintained in the I/O controller hub 40 to track the status of each of the USB host controllers coupled to the I/O controller hub 40, as discussed below. In one embodiment, a bit within the register is reserved for each USB host controller to indicate the state of the USB host controller and to trigger the USB host controller to access the memory 50. For example, a bit may be set to '0' to indicate an inactive state of a USB host controller. Alternatively, a bit may be set to '1' to indicate an active state of a USB host controller.

In one embodiment, these bits may be referred to as run bits. In one embodiment, the number of active USB host controllers (indicated by active run bits) may affect the operation of the USB host controllers. When only one USB host controller is active, operations may proceed normally with the one USB host controller initiating and performing memory accesses. However, when 2 or more USB host controllers are active (i.e., two run bits are set to '1'), the active USB host controllers may be synchronized to perform fetches at approximately the same time. This synchronization may minimize the distribution of memory accesses over time, thereby maximizing the amount of time the processor 20 or other components of the computing platform 10 may be in a low-power state.

Figure 3:
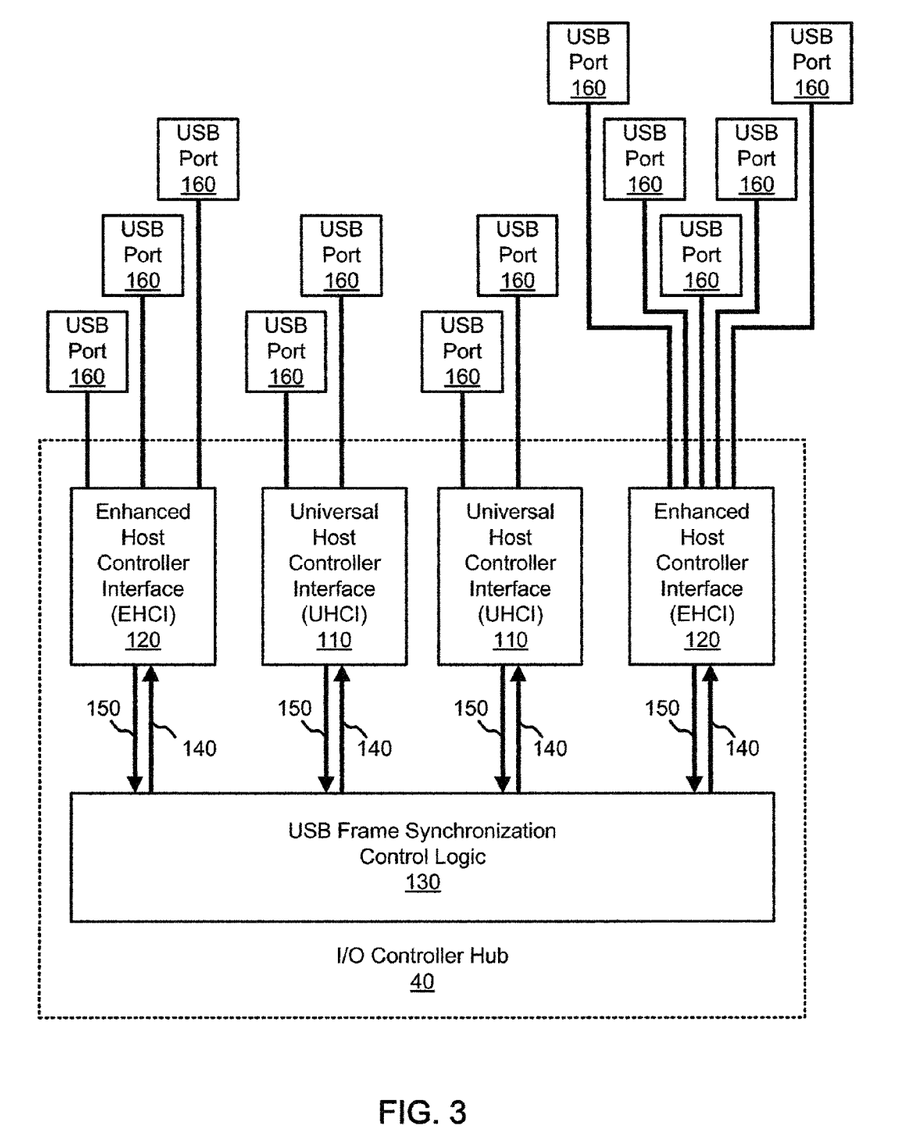
FIG. 3 illustrates one embodiment of an input/output (I/O) controller hub having multiple host controllers with non-uniform frame rates.

FIG. 3 illustrates one embodiment of an I/O controller hub 40 having multiple USB host controllers 110 and 120 with non-uniform frame rates. In other words, the USB host controllers 110 and 120 do not inherently perform memory accesses according to a single time interval. In the depicted embodiment, the I/O controller hub 40 includes two types of USB hub controllers. The universal host controller interface (UHCI) controllers 110 are legacy USB host controllers which have a frame rate of approximately one millisecond (ms). In contrast, the enhanced host controller interface (EHCI) controllers 120 have a frame rate of approximately 125 microseconds (μs). Although only two UHCI controllers 110 and two EHCI controllers 120 are shown, the I/O controller hub 40 may include more or less of each type of USB host controller 110 and 120. In another embodiment, the I/O controller hub 40 also may include open host controller interface (OHCI) controllers or other types of controllers.

Each of the USB host controllers 110 and 120 is coupled to one or more USB ports 160. USB devices (not shown) may be connected to the I/O controller hub 40 via the USB ports 160. Each UHCI controller 110 is configured to support two USB ports 160. Each of the EHCI controllers 120 is configured to flexibly support up to six USB ports 160. For example, one of the illustrated EHCI controllers 120 services three USB ports 160 and the other EHCI controller 120 services five USB ports 160. In other embodiments, other types of controllers may support more or less ports.

The depicted I/O controller hub 40 also includes USB frame synchronization control logic 130. Other potential components of the I/O controller hub 40 are excluded from FIG. 3 for clarity, but may be included in certain implementations of the I/O controller hub 40. For convenience, the USB frame synchronization control logic 130 is referred to as logic 130. In one embodiment, the logic 130 is implemented in hardware as a plurality of transistors. Alternatively, the logic 130 may be implemented as a combination of hardware, including transistors or other hardware logic, and firmware. The logic 130 interacts with the USB host controllers 110 and 120 to synchronize fetches, or memory accesses, by the USB host controllers 110 and 120 (the USB ports 160 serviced by a single USB host controller 110 or 120 also are synchronized with each other through the same USB host controller 110 or 120). Additionally, the logic 130 may influence when a run bit for a particular USB host controller 110 or 120 is set, as well as when the run bit is recognized.

Figure 4:
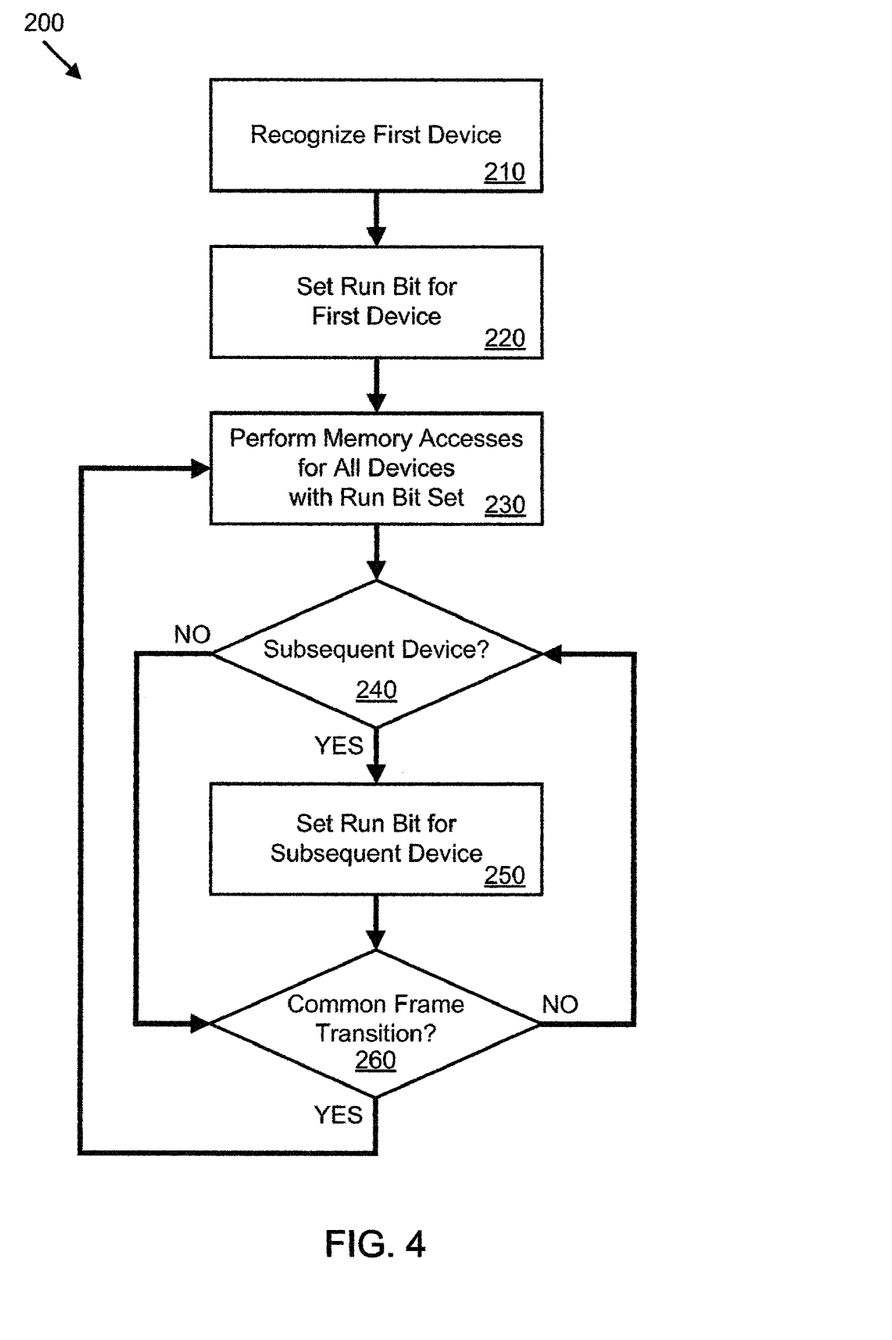
FIG. 4 illustrates one embodiment of a synchronization method to synchronize multiple host controllers with non-uniform frame rates.

FIG. 4 illustrates one embodiment of a synchronization method 200 to synchronize multiple host controllers 110 and 120 with non-uniform frame rates. Certain embodiments of the synchronization method 200 may be implemented in conjunction with the I/O controller hub 40 of FIG. 3. Alternative embodiments may be implemented in other systems having multiple host controllers 110 and 120 with non-uniform frame rates.

The depicted synchronization method 200 begins and the logic 130 recognizes 210 a first USB host controller 110 or 120 on the I/O controller hub 40. For convenience, the description of FIG. 4 uses a first controller to refer to a USB host controller 110 or 120 for which memory accesses are initially performed and a second controller to refer to another USB host controller 110 or 120 for which memory accesses are subsequently initiated after the first controller. However, the order in which specific USB host controllers 110 and 120 are instantiated may vary depending on when devices are plugged into the various USB ports 160 and when the corresponding USB drivers 70 and other host software recognize the USB devices. Furthermore, the first controller 110 may be a UHCI controller 110 or an EHCI controller 120 or another type of host controller. Similarly, the second controller 120 may be a UHCI controller 110 or an EHCI controller 120 or another type of host controller.

In one embodiment, the logic 130 recognizes 210 the first controller and sets 220 a run bit corresponding to the first controller. The logic 130 then performs 230 a memory access for the first controller. The first memory access for the first controller does not need to be, but may be, synchronized with another host controller 110 or 120, a global frame counter, or another synchronization signal. If no other host controllers 110 or 120 are initiated, the logic 130 may continue to perform 230 memory accesses at the frame rate of the first controller 110 (e.g., 1 ms or 125 μs). Alternatively, the logic 130 may perform 230 memory accesses at a common frame rate that is standardized to accommodate different frame rates, but is different from the inherent frame rate of the first controller.

The logic 130 subsequently determines 240 if a second controller is initiated by USB drivers 70 and, if so, sets 250 a run bit corresponding to the second controller. The logic 130 then waits 260 until a common frame transition. Where only the first host controller is operating, the common frame transition may be any subsequent frame transition of the first controller. Alternatively, the common frame transition may be a modified frame transition that accommodates both the first and second controllers. Alternatively, the logic 130 may wait to set the run bit corresponding to the second controller until approximately the time of the common frame transition.

After the run bit corresponding to the second controller has been set 250 and the common frame transition is established 260, the logic 130 then performs 130 synchronized memory accesses for both the first and second controllers. Additional controllers 110 or 120 may be synchronized with the first and second controllers 110 and 120 in a similar manner. Additionally, active controllers may be deactivated for example, when a USB device is unplugged from a USB port 160, and the corresponding host controller 110 or 120 may be removed from operation. The remaining host controllers 110 and 120 may continue to operate in a synchronized manner. Alternatively, if there is only one remaining host controller 110 or 120, then the logic 130 may continue to perform 230 memory accesses at the common frame rate or may perform 230 memory accesses at the inherent frame rate of the remaining host controller 110 or 120.

In one embodiment, an EHCI host controller 120 may be synchronized with a UHCI host controller 110 by performing each frame fetch for the UHCI host controller 110 at approximately the same time as every eighth frame fetch for the EHCI host controller 120. This synchronizes the host controllers 110 and 120 in the sense that each memory access for the UHCI host controller 110 occurs at the same time as a memory access for the EHCI host controller 120, rather than between fetches by the EHCI host controller 120. For example, the logic 130 may track every eight fetches for the EHCI host controller 120 because fetches occur every 125 μs so eight fetches span approximately one millisecond. In another embodiment, the EHCI host controller 120 may delay the fetches so that the memory accesses only occur every one millisecond rather than eight times every millisecond.

Although first and second host controllers 110 and 120 are referenced herein, the references to the first and second host controllers 110 and 120 is merely representative of multiple host controllers. References to the first and second host controllers 110 and 120 within the specification and claims should not be limited to only two host controllers and may include one or more additional host controllers within the described and/or claimed embodiments. Other embodiments may include more than two host controllers 110 and 120, different combinations of UHCI host controllers 110, EHCI host controllers 120, and other types of host controllers.

Figure 5:
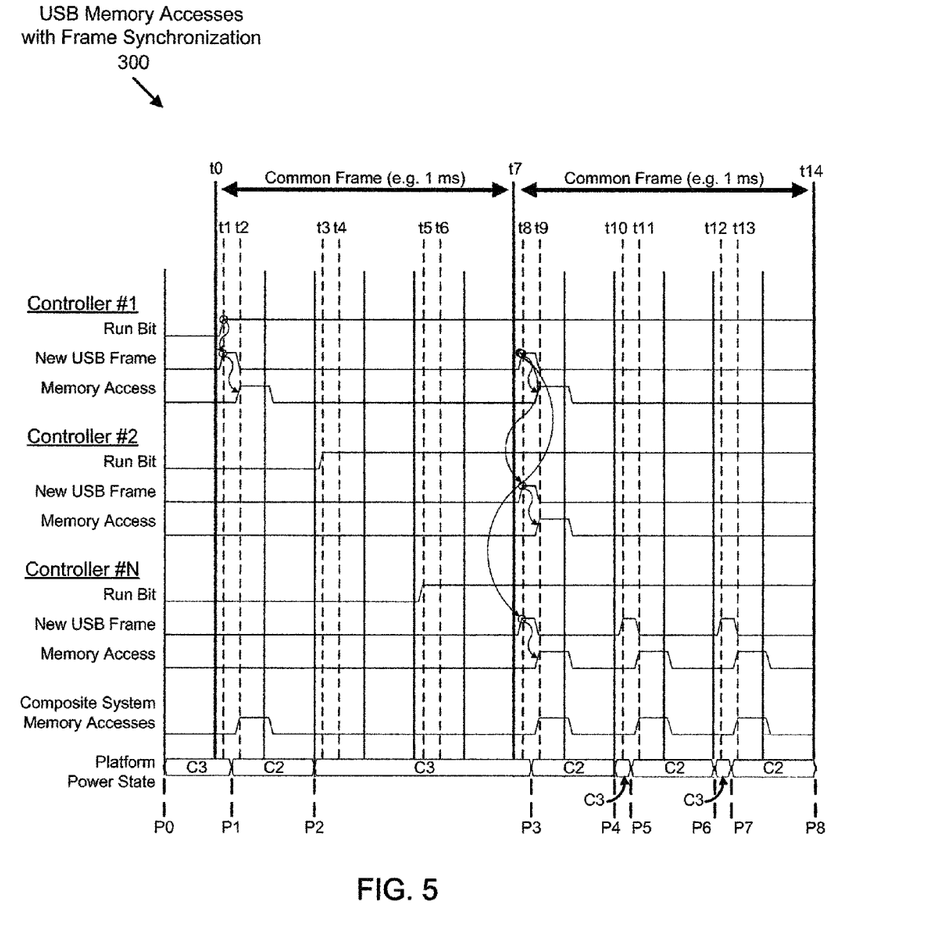
FIG. 5 illustrates one embodiment of a timing diagram for operation of synchronized host controllers.

FIG. 5 illustrates one embodiment of a timing diagram 300 for operation of synchronized host controllers 110 and 120. The timing diagram 300 shows a first memory access for a first host controller, which begins a common frame. Although second and third host controllers are recognized and their run bits are set during the first frame, memory accesses for the second and third host controllers are not performed until the common frame transition between the first and second frames. In another embodiment, the logic 130 may wait and set the run bits for the second and third controllers at approximate the common frame transition, rather than at the time the second and third controllers are recognized.

Additionally, the third host controller is representative of an EHCI controller 120 or other type of controller which performs more memory accesses per frame than a legacy host controller 110. In particular, the third controller is shown as performing three fetches during the second frame, rather than a single memory access. Although the third controller performs more memory accesses than the first and second controllers, the third controller may still be considered synchronized with the first and second controllers because one of the memory accesses of the third controller is synchronized with the memory accesses of the first and second controllers.

The composite system memory access signal shown toward the bottom of the timing diagram 300 illustrates that memory accesses for all of the host controllers 110 and 120 are synchronized at approximately the beginning of each common frame. This minimizes the amount of time that the I/O controller hub 40 prevents the processor 10 or other system components from entering a low-power state such as the C3 state. Although the timing diagrams of FIGS. 5 and 1 are only schematic, the difference between the extended time of the C3 power state in the timing diagram 300 of FIG. 5 can be seen by the cumulative and uninterrupted time that the processor 10 may be in the C3 state. It should also be noted that although the composite system memory accesses of the second frame of the timing diagram 300 of FIG. 5 appear to be similar to the composite system memory accesses of the second frame of the timing diagram of FIG. 1, this apparent resemblance is not indicative of performance. The timing diagram of FIG. 1 shows composite system memory accesses of various host controllers 110 each accessing system memory 50 at a frame rate of 1 millisecond. In contrast, the timing diagram 300 of FIG. 5 shows composite system memory accesses of a host controller 110 accessing system memory 50 at a frame rate of 125 microseconds, in addition to the host controllers 110 accessing system memory 50 at a frame rate of 1 millisecond. Additionally, the system memory accesses of the host controllers 110 of FIG. 1 are not synchronized, whereas the host controllers 110 of FIG. 5 are synchronized, even though host controllers with different frame rates are both implemented.

Figure 6:
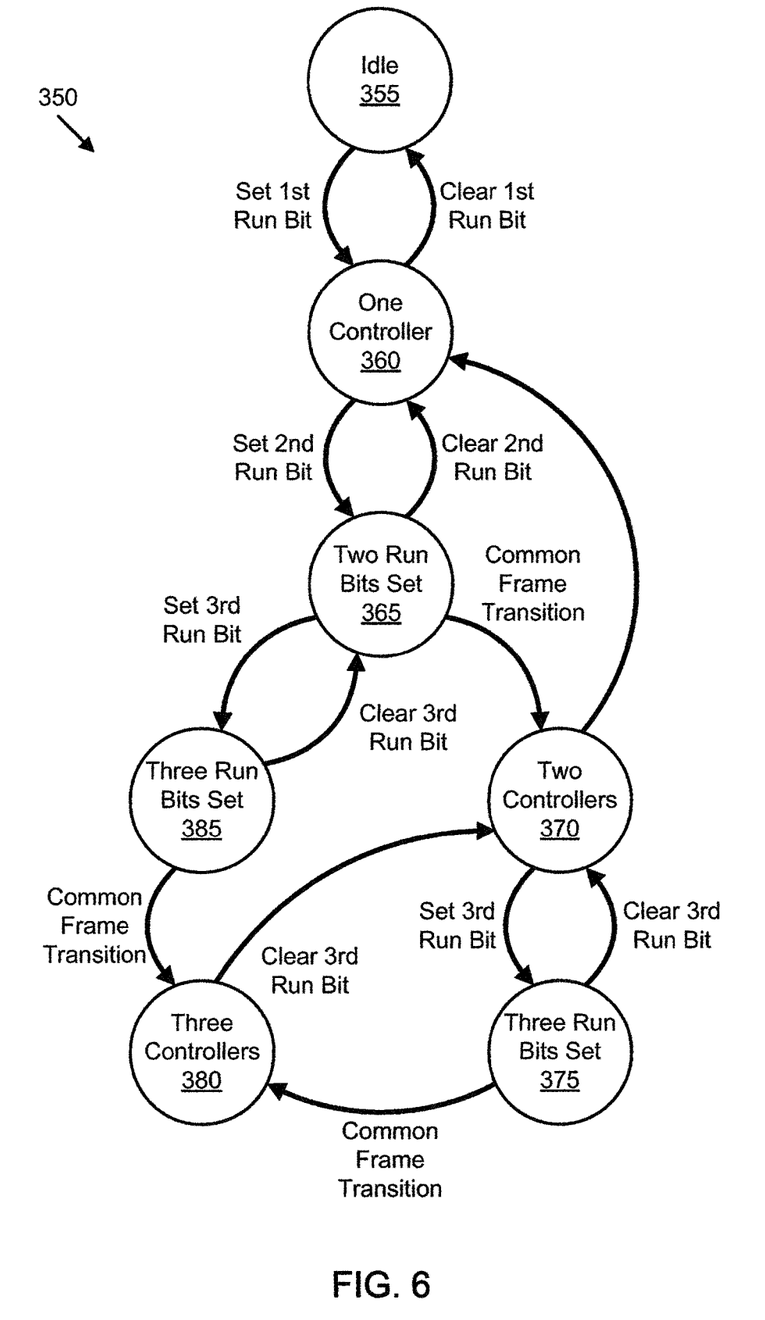
FIG. 6 illustrates one embodiment of a state diagram for a state machine to synchronize multiple host controllers.

FIG. 6 illustrates one embodiment of a state diagram 350 for a state machine to synchronize multiple host controllers 110 and 120. In one embodiment, the state machine may be implemented in the logic 130. For convenience in explaining the operation of the state machine, the state machine is illustrated as operating on three independent USB host controllers 110 and 120, designated as a first controller, a second controller, and a third controller. However, other embodiments may accommodate more or less USB host controllers 110 and 120. Additionally, the host controllers 110 and 120 may be instantiated in any order.

Initially all three USB host controllers 110 and 120 are in an idle state 355. The first controller is allowed to start as soon as its run bit is set. As described above, the run bit may be a data value stored in a register 80 that indicates that the first controller has been started and subsequently will begin fetching at a frame rate. The state where the first controller is running is designated as the "one controller" state 360. As the second and third controllers are recognized, the corresponding run bits are set, but the second and third controllers are gated until a common frame transition, or start of frame marker, from the first controller is observed. The common frame transition may be based on the frame counter of the first controller or a global frame counter that is different from the frame counter of the first controller. As the run bits are set for the second and third controllers and the common frame transition is established, the state machine may enter the "two controllers" state 370 and the "three controllers" state 380.

In one embodiment, the logic 130 may utilize a timer connected with each USB host controller 110 and 120 that indicates when the common frame time period has expired, thereby indicating a start of frame marker. The logic 130 may recognize a "timer expired" or "timer rolled over" indication from the one of the USB host controllers 110 or 120, and utilize this indication to indicate when the logic 130 performs fetches for the other USB host controllers 110 and 120. In this way, new software does not have to be utilized, as the logic 130 can observe the run bit and timer indications from each USB host controller 110 or 120 to synchronize multiple USB host controllers 110 and 120. Alternatively, software may be used. In another embodiment, a global frame counter may be implemented within the logic 130.

As another example, the USB frame synchronization control logic 130 may be integrated into an I/O device such as the I/O controller hub 40, which includes multiple USB host controllers 110 and 120 (e.g., EHCI, UHCI, and/or OHCI). In one embodiment, the logic 130 includes an output interface to the several USB host controllers 110 and 120 to prevent the frame counters of the multiple USB host controllers 110 and 120 from incrementing asynchronously. The logic 130 also may include an input interface to receive a signal from each of the USB host controllers 110 and 120 to indicate when each USB host controller 110 or 120 starts a new frame. The input interface also may be used to input a signal to indicate the current value of the run bit of each of the USB host controllers 110 and 120.

In another embodiment, the USB frame synchronization may be implemented such that out of reset all the USB host controllers 110 and 120 are idled with their respective run bits cleared, which prevents activity from the USB host controllers 110 and 120. When software subsequently sets the run bit of one of the USB host controllers 110 or 120, its frame counter starts as normal and the USB host controller 110 or 120 will access system memory 50. When a subsequent run bit is set on a different USB host controller 110 or 120, the frame counter of the subsequent USB host controller 110 or 120 does not immediately start. Instead, the USB frame synchronization control logic 130 holds off the frame counter until the first USB host controller 110 or 120 reaches a frame boundary. Similar operations may be implemented to synchronize subsequent USB host controllers 110 and 120 as associated run bits are set. This frame synchronization between the USB host controllers 110 and 120 synchronizes frame list memory read accesses to system memory 50 which would otherwise occur asynchronously. In one embodiment, if the frames do not have any active transfer descriptors, then there will be few, if any, fetches after the frame list pointer. Additionally, the I/O controller hub 40 does not distribute requests from multiple controllers 110 and 120, but instead has a more tightly controlled period of time where all controllers 110 and 120 simultaneously parse their respective lists. In time periods where little to no USB traffic is scheduled, the computing platform 10 can transition to lower power states. Otherwise, these times might be characterized by random memory activity of unsynchronized controllers 110 and 120, which would prevent the computing platform 10 from transitioning to the lower power states.

In one embodiment, the frame synchronization described above may reduce the memory access footprint of the USB host controllers 110 and 120 in order to allow other components of the computing platform 10 to enter lower power states more often and remain in low power states for extended periods of time. Lower platform power is highly valuable in various computing platforms, including mobile platforms. Furthermore, as additional USB host controllers 110 and 120 are added to a computing platform 10 to address new initiatives, the effectiveness of frame synchronization may further increase platform performance. Moreover, the ability to govern the interaction between independent USB host controllers 110 and 120 to synchronize their frame counters in a software-transparent means may provide lower power to the computing platform 10.

Figure 7:
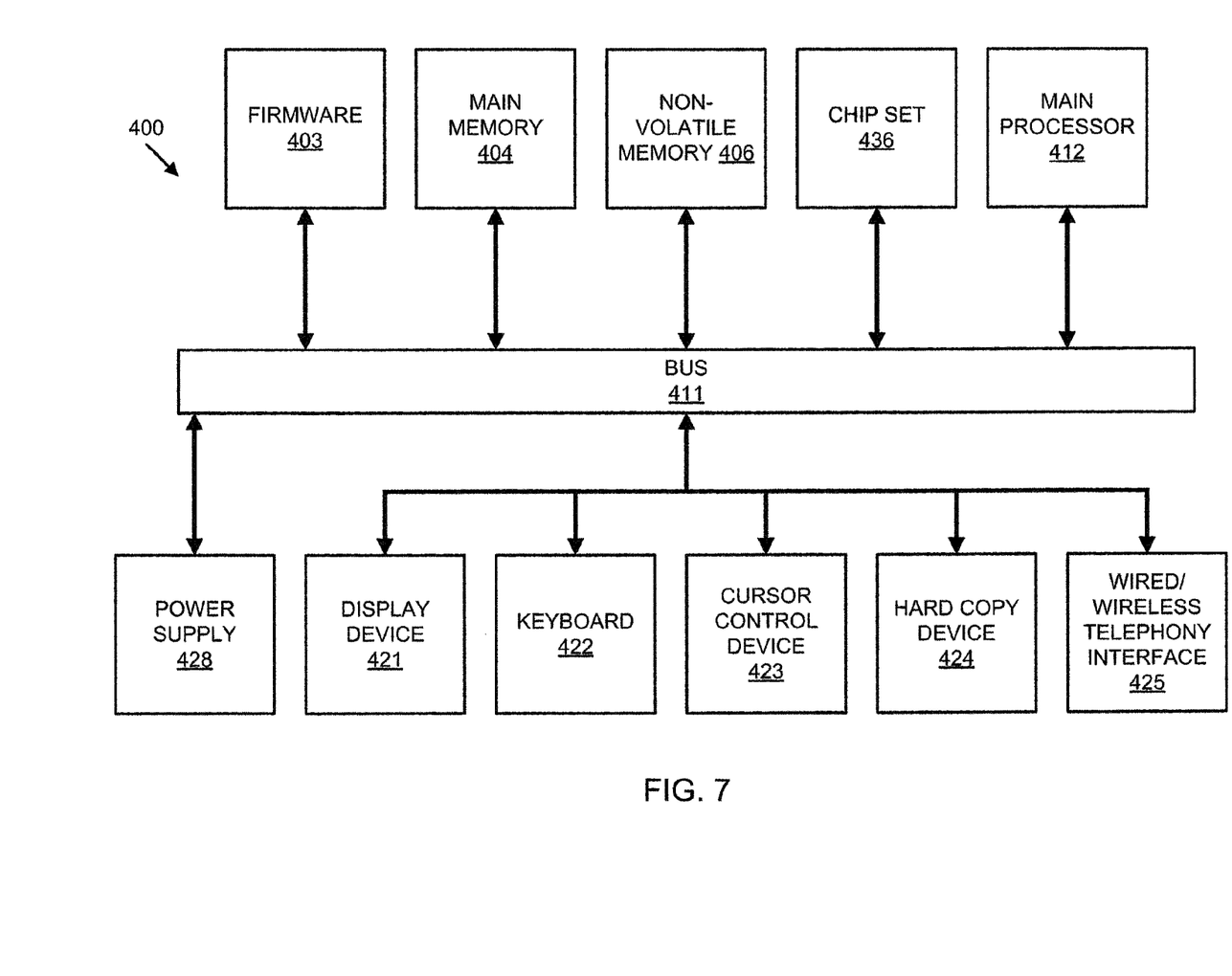
FIG. 7 illustrates an alternative embodiment of a computing platform to synchronize multiple host controllers.

FIG. 7 illustrates an alternative embodiment of a computing platform 400 to synchronize multiple host controllers 110 and 120. In one embodiment, the computing platform 400 may be a mobile device. Examples of mobile devices include a laptop computer, a cell phone, a personal digital assistant, or other similar device with on board processing power and wireless communications ability that is powered by a direct current (DC) power source such as a fuel cell or a battery which supplies DC voltage to the mobile device and is solely within the mobile device. Additionally, the DC power source may be recharged on a periodic basis.

In one embodiment, the computer system 400 comprises a communication mechanism or bus 411, for communicating information, and an integrated circuit component such as a main processing unit 412 coupled with bus 411 for processing information. One or more of the components or devices in the computer system 400 such as the main processing unit 412 or a chipset 436 may facilitate frame synchronization. The main processing unit 412 may include one or more processor cores working together as a unit.

The computer system 400 further comprises a random access memory (RAM) or other dynamic storage device 404 (referred to as main memory) coupled to the bus 411 for storing information and instructions to be executed by the main processing unit 412. The main memory 404 also may be used for storing temporary variables or other intermediate information during execution of instructions by the main processing unit 412. The computer system 400 also includes a read-only memory (ROM) and/or other static storage device 406 coupled to the bus 411 for storing static information and instructions for the main processing unit 412. The static storage device 406 may store operating system (OS) level and application level software.

The firmware 403 may be a combination of software and hardware, such as electronically programmable read-only memory (EPROM), which has the operations for the routine recorded on the EPROM. The firmware 403 may include embedded foundation code, basic input/output system code (BIOS), or other similar code. The firmware 403 may make it possible for the computer system 400 to boot itself.

Additionally, the computer system 400 may be coupled to or have an integral display device 421, such as a cathode ray tube (CRT) or liquid crystal display (LCD), coupled to the bus 411 to display information to a computer user. In one embodiment, the chipset 436 may interface with the display device 421.

An alphanumeric input device (keyboard) 422, including alphanumeric and other keys, also may be coupled to the bus 411 for communicating information and command selections to the main processing unit 412. Furthermore, a cursor control device 423, such as a mouse, trackball, trackpad, stylus, or cursor direction keys, may be coupled to the bus 411 for communicating direction information and command selections to the main processing unit 412, and for controlling cursor movements on the display device 421. In one embodiment, the chipset 436 may interface with the input/output devices. Similarly, devices capable of making a hardcopy 424 of a file, such as a printer, scanner, copy machine, etc., also may interact with the input/output chipset 436 and bus 411.

A power supply such as a battery and alternating current (AC) adapter circuit may be coupled to the bus 411. Furthermore, a sound recording and playback device, such as a speaker and/or microphone (not shown), may optionally be coupled to the bus 411 for audio interfacing with computer system 400. A wireless communication module 425 also may be coupled to the bus 411. The wireless communication module 425 may employ a wireless application protocol (WAP) to establish a wireless communication channel. The wireless communication module 425 may implement a wireless networking standard such as Institute of Electrical and Electronics Engineers (IEEE) 802.11 standard, IEEE std. 802.11-1999, published by IEEE in 1999. In other embodiments, other types of wireless technologies may be implemented in the computer system 400.

In one embodiment, software used to facilitate the operation of the computer system 400 may be embedded onto a machine-readable medium. A machine-readable medium includes any mechanism that provides (i.e., stores and/or transmits) information in a form accessible by a machine (e.g., a computer, network device, personal digital assistant, manufacturing tool, any device with one or more processors, etc.). For example, a machine-readable medium may include recordable/non-recordable media (e.g., read only memory (ROM) including firmware, random access memory (RAM), magnetic disk storage media, optical storage media, flash memory devices, etc.), as well as electrical, optical, acoustical or other form of propagated signals (e.g., carrier waves, infrared signals, digital signals, etc.), and so forth.

Embodiments of the present invention include various operations, as described above. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses.

Additionally, the interconnection between circuit components or blocks may be shown as buses or as single signal lines. Each of the buses may alternatively be one or more single signal lines and each of the single signal lines may alternatively be buses.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. An apparatus, comprising:
    a first universal serial bus (USB) host controller to access memory at a first frame rate;
    a second USB host controller to access the memory at a second frame rate which is different from the first frame rate, wherein one of either the first or second USB host controllers is an initial host controller and the other of the first or second USB host controllers is a subsequent host controller; and
    logic coupled to the first and second USB host controllers to synchronize the memory accesses of the first and second USB host controllers at a common frame rate in response to recognition of the subsequent host controller.

2. The apparatus of claim 1, wherein the logic is operable to allow the initial host controller to access the memory at approximately a first memory access time when a first run bit is set for the initial host controller and at subsequent memory access times after the first memory access time.

3. The apparatus of claim 2, wherein the logic is further operable to prevent the subsequent host controller from accessing the memory until a second run bit is set for the subsequent host controller and the memory access for the subsequent host controller is synchronized with one of the subsequent memory access times of the initial host controller.

4. The apparatus of claim 3, further comprising a register coupled to the logic to store the first and second run bits.

5. The apparatus of claim 4, wherein the logic is further operable to store the second run bit at approximately one of the subsequent memory access times.

6. The apparatus of claim 4, wherein the logic is further operable to store the second run bit at a time between two of the subsequent memory access times.

7. The apparatus of claim 1, wherein the logic comprises a global frame counter to indicate a transition between consecutive synchronized frames at the common frame rate.

8. The apparatus of claim 1, wherein the common frame rate comprises a frame rate equal to one of the first and second frame rates.

9. The apparatus of claim 1, wherein the common frame rate is slower than the first and second frame rates.

10. The apparatus of claim 1, wherein:
    the first USB host controller comprises a universal host controller interface (UHCI) controller and the first frame rate is approximately 1 millisecond; and
    the second USB host controller comprises an enhanced host controller interface (EHCI) controller and the second frame rate is approximately 125 microseconds.

11. The apparatus of claim 1, wherein the logic is operable to require the initial host controller to access the memory at the common frame rate prior to synchronization of the initial host controller with the subsequent host controller to accommodate different frame rates.

12. The apparatus of claim 11, wherein the logic is further operable to require a single remaining USB host controller after any other USB host controller is removed from operation to continue to perform accesses at the common frame rate.

13. A system, comprising:
    an input/output (I/O) controller hub to synchronize a first USB host controller and a second USB host controller at a common frame rate, wherein the first USB host controller has a first frame rate and the second USB host controller has a second frame rate, either the first or second USB host controllers being an initial host controller and the other of the first or second USB host controllers being a subsequent host controller, the I/O controller hub to synchronize the first and second USB host controllers in response to recognition of the subsequent host controller; and
    a volatile memory device coupled to the I/O controller hub to store a first register bit associated with the first USB host controller and a second register bit associated with the second USB host controller.

14. The system of claim 13, further comprising a central processing unit (CPU) coupled to the I/O controller hub to execute instructions from driver for a USB device, wherein the USB device is coupled to one of the first and second USB host controllers.

15. The system of claim 14, wherein the first USB host controller comprises a universal host controller interface (UHCI) controller, the second USB host controller comprises an enhanced host controller interface (EHCI) controller, and the common frame rate is approximately 1 millisecond.

16. The system of claim 13, wherein the I/O controller hub is to require the initial host controller to access the memory at the common frame rate prior to synchronization of the initial host controller with the subsequent host controller to accommodate different frame rates.

17. The system of claim 16, wherein the I/O controller hub is further operable to require a single remaining USB host controller after any other USB host controller is removed from operation to continue to perform memory accesses at the common frame rate.

18. A method for synchronizing multiple controllers with non-uniform frame rates, comprising:
    facilitating a plurality of memory accesses of a first USB host controller at a first frame rate; and
    synchronizing a plurality of memory accesses of a second USB host controller with the plurality of memory accesses of the first USB host controller, wherein the first frame rate is different from an unsynchronized frame rate of the second host controller, wherein synchronizing includes:
        identifying one of the first and second USB host controllers as an initial host controller,
        setting a run bit of the initial host controller,
        identifying the other of the first and second USB host controllers as a subsequent host controller, and
        setting a run bit of the subsequent host controller;
    wherein synchronizing occurs in response to recognition of the subsequent host controller.

19. The method of claim 15, further comprising:
setting the run bit of the subsequent host controller in between first and second frame transitions of the initial host controller; and
preventing the subsequent host controller from performing a first one of the plurality of memory accesses of the subsequent host controller until the second frame transition of the initial host controller.

20. The method of claim 15, further wherein
the other of the first and second USB host controllers is identified as the subsequent host controller in between first and second frame transitions of the initial host controller, and further comprising:
maintaining the run bit of the subsequent host controller cleared in between the first and second frame transitions of the initial host controller; and
setting the run bit of the subsequent host controller at approximately the second frame transition of the initial host controller.

21. The method of claim 18, further comprising:
operating a computing platform in a normal power state approximately during the synchronized plurality of memory accesses of the first and second USB host controllers; and
operating the computing platform in a low power state approximately in between consecutive memory accesses of the synchronized plurality of memory accesses of the first and second USB host controllers.

22. The method of claim 18, further comprising requiring the initial host controller to access the memory at the common frame rate prior to synchronization of the initial host controller with the subsequent host controller to accommodate different frame rates.

23. The method of claim 22, further comprising requiring a single remaining USB host controller after any other USB host controller is removed from operation to continue to perform memory accesses at the common frame rate.

24. An apparatus, comprising:
means for implementing a plurality of memory accesses of a plurality of USB host controllers, wherein the plurality of USB host controllers are operable to access memory at two or more frame rates in an unsynchronized computing environment;
means for recognizing one of the plurality of USB host controllers as an initial host controller and another of the plurality of USB host controllers as a subsequent host controller; and
means for synchronizing the plurality of memory accesses of the initial and subsequent host controllers at a common frame rate in response to recognition of the subsequent host controller.

25. The apparatus of claim 24, further comprising means for maximizing an amount of time between consecutive memory accesses of the plurality of memory accesses.

26. The apparatus of claim 25, wherein the plurality of USB host controllers are coupled within a synchronized computing platform, the apparatus further comprising means for putting the synchronized computing platform in a low power state approximately during the time between the consecutive memory accesses.

27. A non-transitory machine readable medium storing instructions, which when executed by the machine, to cause the machine to perform the following operations, comprising:
implement a plurality of memory accesses of a plurality of USB host controllers, wherein the plurality of USB host controllers are operable to access memory at two or more frame rates in an unsynchronized computing environment; and
synchronize the plurality of memory accesses of the plurality of USB host controllers at a common frame rate, wherein synchronizing includes:
identifying one of the plurality of USB host controllers as an initial host controller,
setting a run bit of the initial host controller,
identifying another of the plurality of USB host controllers as a subsequent host controller, and
setting a run bit of the subsequent host controller;
wherein synchronizing occurs in response to recognition of the subsequent host controller.

28. The machine readable medium of claim 27, storing further instructions to cause the machine to perform further operations, comprising:
operate a computing platform in a normal power state approximately during the synchronized plurality of memory accesses of the plurality of USB host controllers; and
operate the computing platform in a low power state approximately in between consecutive memory accesses of the synchronized plurality of memory accesses of the plurality of USB host controllers.

29. The machine readable medium of claim 27, storing further instructions to cause the machine to perform further operations, comprising:
prevent the subsequent host controller from accessing a memory until the initial host controller accesses the memory.

* * * * *